United States Patent

Freeborn

[15] 3,638,130

[45] Jan. 25, 1972

[54] HIGH-SPEED AMPLIFIER FOR DRIVING AN INDUCTIVE LOAD

[72] Inventor: John C. Freeborn, West Covina, Calif.

[73] Assignee: Honeywell Inc., Minneapolis, Minn.

[22] Filed: June 8, 1970

[21] Appl. No.: 48,798

Related U.S. Application Data

[63] Continuation of Ser. No. 707,274, Feb. 21, 1968.

[52] U.S. Cl. ..................................330/30 D, 330/69, 330/40

[51] Int. Cl. ..........................................................H03f 3/68

[58] Field of Search.........................330/69, 46, 30 D; 315/27

[56] References Cited

UNITED STATES PATENTS 3,426,241 2/1969 Perkins....................................315/27

3,155,873 11/1964 Paschal..............................315/27 TD

*Primary Examiner*—Nathan Kaufman

*Attorney*—Charles J. Ungemach and Ronald T. Reiling

[57] ABSTRACT

A high-speed amplifier for use with a center tapped inductive winding such as found in the deflection coils of a CRT. The amplifier employs an inductive energy storage coil and means for differentially limiting the currents permitted to flow from the coil into opposite ends of the winding, whereby rapidly decreasing current flow through one end of the winding causes rapid increase in current flow through the other end of the winding as a result of back EMF generated by the coil.

6 Claims, 4 Drawing Figures

INVENTOR.
JOHN C. FREEBORN

BY Bruce C Lutz

ATTORNEY

INVENTOR.
JOHN C. FREEBORN

BY Bruce C Lutz

ATTORNEY

HIGH-SPEED AMPLIFIER FOR DRIVING AN INDUCTIVE LOAD

CROSS REFERENCE TO RELATED APPLICATION

This application is a continuation of copending application Ser. No. 707,274, filed Feb. 21, 1968 for Control Apparatus in the name of the same inventor and assigned to the same assignee as the present application.

THE INVENTION

The present invention is generally related to electronics and more specifically related to a high-speed electromagnetic deflection amplifier.

While there are prior art deflection amplifiers, they are not generally both simple and capable of the operational speed required in some applications. The present invention utilizes a series inductor in most embodiments to generate a high-voltage-low-duty cycle circuit which speeds up the switching of current through an inductive load such as may be found in the deflection coils of a cathode-ray tube (CRT.)

It is therefore an object of this invention to provide improved amplifying apparatus.

Other objects and advantages of this invention may be ascertained from a reading of the specification and appended claims in conjunction with the drawings wherein:

Figure 1:
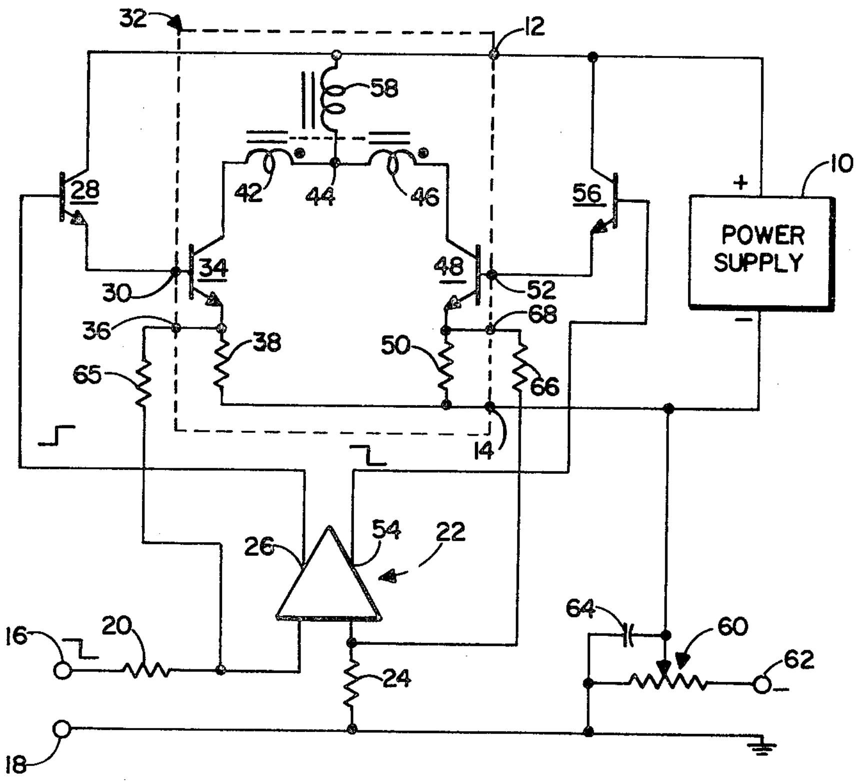
FIG. 1 is a schematic diagram of one embodiment of the invention.

In FIG. 1 a floating power supply 10 supplies power between output terminals 12 and 14. An input signal is supplied between an input terminal 16 and ground 18. A resistor 20 is connected between input 16 and an input of a differential amplifier generally designated as 22. A resistor 24, which is primarily used for summing purposes, is connected between ground 18 and the other input of differential amplifier 22. A first output 26 of amplifier 22 is connected to a base of an NPN-transistor 28 having a collector connected to terminal 12 and an emitter connected to a terminal 30. Terminals 12 and 30 represent connections to a subcircuit shown within dashline block 32. Terminal 30 is connected within block 32 to a base of an NPN-transistor 34 whose emitter is connected to a terminal 36 on block 32 and is also connected through a resistor 38 to terminal 14 on block 32. A collector of transistor 34 is connected through a winding 42 to a junction point 44. Junction point 44 is connected through a winding 46 to a collector of an NPN-transistor 48 whose emitter is connected through a resistor 50 to terminal 14 and whose base is connected to a terminal 52 on dashed block 32. An output 54 of differential amplifier 22 is connected to a base of an NPN-transistor generally designated as 56 having a collector connected to terminal 12 and an emitter connected to terminal 52. The windings 42 and 46 are part of a common load for which junction point 44 is a center tap. The two windings 42 and 46 have a common magnetic core and are wound as indicated in accordance with standard dot convention. That is, current entering the dotted ends of both windings produces like-directed magnetic fluxes along the common flux paths. The windings 42 and 46 form a differentially responsive inductive load. For purposes of this specification, a differentially responsive inductive load is an inductive load connected so that the current in one portion thereof decreases as the current in a second portion thereof increases, and vice versa. Junction point 44 is connected through a further inductance or choke 58 to terminal 12.

Terminal 14 is connected to a wiper of a potentiometer generally designated as 60 having one end of its resistance element connected to ground 18 and the other end connected to a negative power supply terminal 62. A capacitor 64 is connected between the wiper of potentiometer 60 and ground 18. A resistor 65, which provides feedback, is connected between terminal 36 and a junction point between resistor 20 and one input of amplifier 22. A further feedback resistor 66 is connected between a terminal 68 on block 32 and the other input of amplifier 22 to which resistor 24 is connected. The purpose of resistors 65 and 66 is to increase the operating stability of the circuit. Terminal 68 is connected to the emitter of transistor 48.

Figure 2:
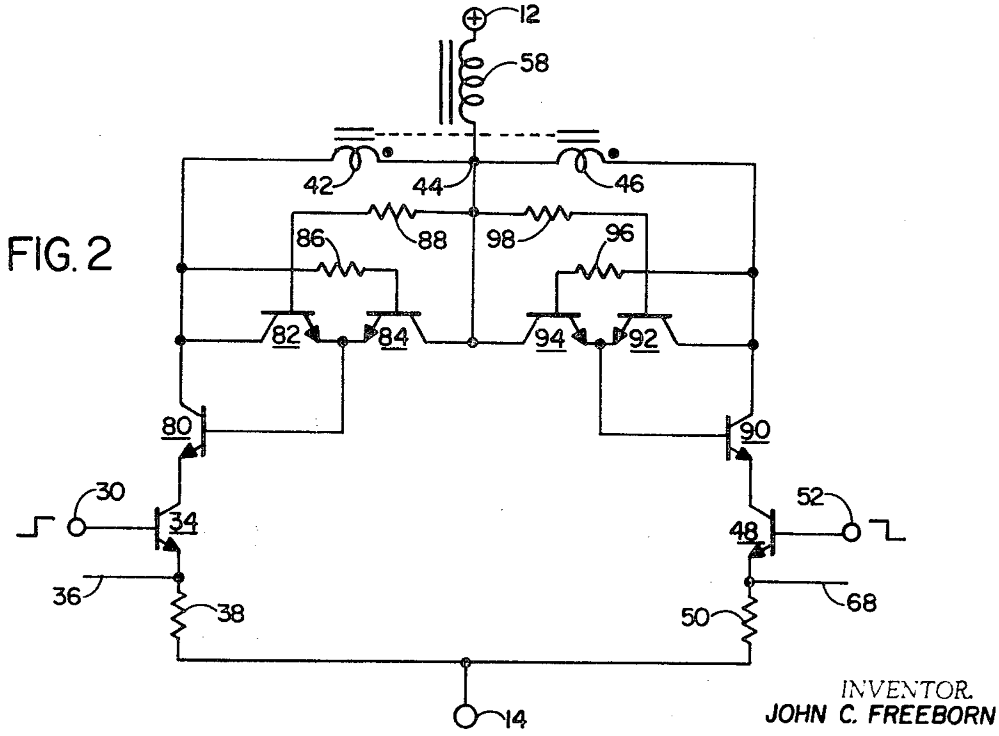
FIG. 2 illustrates an alternate circuit which may be used to replace a portion of the circuit shown in FIG. 1.

Components in FIG. 2 which are similar to those in FIG. 1 are numbered identically for ease of illustration and discussion. Thus, terminals 12, 14, 30, 36, 52, and 68, junction point 44 and components 34, 38, 42, 46, 48, 50, and 58 respectively represent similar features in both FIGS. 1 and 2. However, the subcircuit shown in FIG. 2 includes an NPN-transistor 80 having an emitter connected to the collector of transistor 34 and a collector connected to the undotted terminal of winding 42. An NPN-transistor 82 has a collector connected to the collector of transistor 80 and an emitter connected to both a base of transistor 80 and an emitter of an NPN-transistor 84. A collector of transistor 84 is connected to junction point 44 and a base thereof is connected through a resistor 86 to the collector of transistor 80. A base of transistor 82 is connected through a resistor 88 to junction point 44.

An NPN-transistor 90 has an emitter connected to the collector of transistor 48 and a collector connected to the dotted terminal of winding 46. A base of transistor 90 is connected to an emitter of an NPN-transistor 92 whose collector is connected to the collector of transistor 90. The base of transistor 90 is also connected to an emitter of an NPN-transistor 94 whose collector is connected to junction point 44. A resistor 96 is connected between a base of transistor 94 and the collector of transistor 90' a resistor 98 is connected between junction point 44 and a base of transistor 92.

Figure 3:
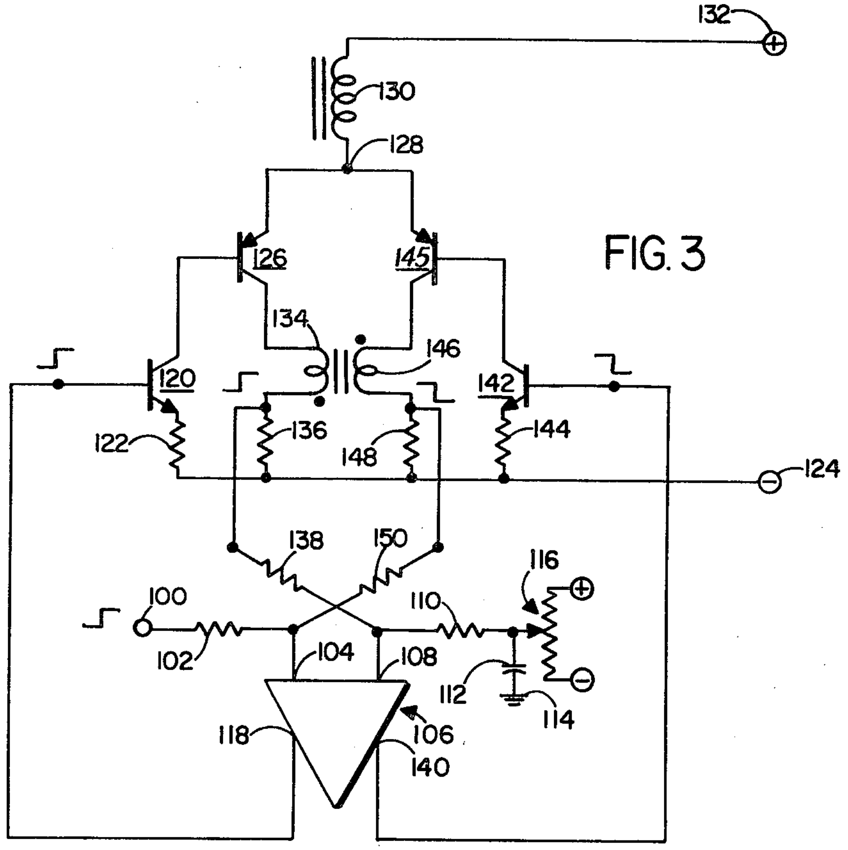
FIG. 3 is a circuit diagram of a second embodiment of the invention.

In FIG. 3 an input terminal 100 is connected through a resistor 102 to a first input 104 of a noninverting differential operational amplifier 106. A second input 108 of amplifier 106 is connected through a series connection of a resistor 110 and a capacitor 112 to ground 114. A junction point between capacitor 112 and resistor 110 is connected to a wiper of a potentiometer 116 whose resistance element is connected between positive and negative power terminals with respect to ground 114. A first output 118 of amplifier 106 is connected to a base of an NPN-transistor generally designated as 120 having an emitter connected through a resistor 122 to a negative power terminal 124. A collector of transistor 120 is connected to a base of a PNP-transistor 126 whose emitter is connected to a junction point 128. A choke or inductive element 130 is connected between junction point 128 and a positive power terminal 132. A collector of transistor 126 is connected through an inductive winding 134 to one side of a resistive element 136 whose other end is connected to terminal 124. The end of winding 134 which is connected to resistor 136 is dotted and is further connected through a resistor 138 to input 108 of amplifier 106. An output 140 of amplifier 106 which produces a signal out of phase with the signal produced at output 118, is connected to a base of an NPN-transistor 142 having an emitter connected through a resistor 144 to terminal 124. A collector of transistor 142 is connected to a base of a PNP-transistor 145 having an emitter connected to junction point 128 and a collector connected to a dotted end of an inductive winding 146 whose other end is connected to one end each of a resistor 148 and a resistor 150. The other end of resistor 148 is connected to terminal 124 while the other end of resistor 150 is connected to input 104 of amplifier 106. A two windings 134 and 146 have a common magnetic core.

Thus far in the specification the various elements such as transistors have been called transistors but it is to be realized that in many instances the broader terminology of switching means or amplifying means accurately applies. Further, the resistors or inductors may be other types of impedance means under some circumstances.

Figure 4:
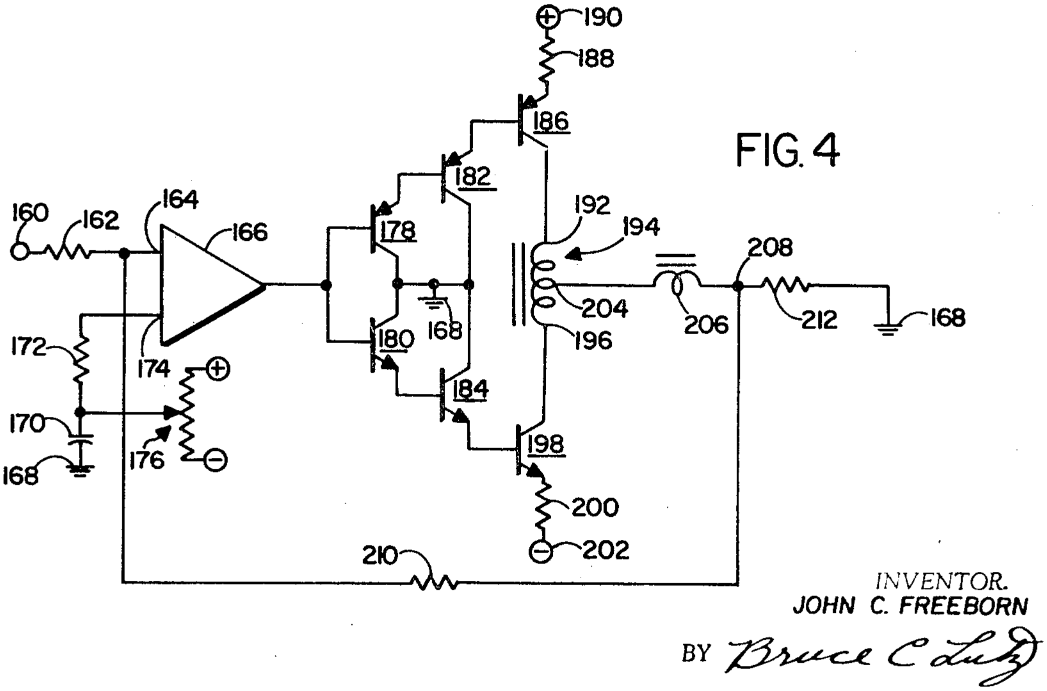
FIG. 4 is a circuit diagram of a third embodiment of the invention.

In FIG. 4 an input terminal 160 is connected through a resistor 162 to a first noninverting input 164 of a differential amplifier 166. Ground 168 is connected through a capacitor 170 and a resistor 172 to a second input 174 of amplifier 166. A junction point between capacitor 170 and resistor 172 is connected to a wiper of a potentiometer 176 which has its resistance element connected between positive and negative power terminals. An output of amplifier 166 is connected to the bases of a PNP-transistor 178 and an NPN-transistor 180. Collectors of the transistors 178 and 180 are connected together and to the ground 168. The emitter of transistor 178 is connected to a base of a PNP-transistor 182 while an emitter of transistor 180 is connected to a base of an NPN-transistor 184. The collectors of transistors 182 and 184 are connected together and to ground 168. An emitter of transistor 182 is connected to a base of a PNP-transistor 186 whose emitter is connected through a resistor 188 to a positive power terminal 190. A collector of transistor 186 is connected to one end 192 of an energy storage means, inductive means, or center-tapped choke 194 whose other end 196 is connected to a collector of an NPN-transistor 198. A base of transistor 198 is connected to an emitter of transistor 184 while an emitter of transistor 198 is connected through a resistor 200 to a negative power terminal 202. A center tap 204 of energy storage device 194 is connected through an inductive load 206 to a junction point 208. A feedback resistor 210 is connected between junction point 208 and noninverting input 164 of amplifier 166. A resistor 212 is connected between junction point 208 and ground 168.

OPERATION

In operation, a falling step input to terminal 16 with respect to terminal 18 in FIG. 1 will produce a rising output at output 26 of amplifier 22. The rising output will turn ON transistors 28 and 34. At the same time a falling output will appear at output 54 of amplifier 22 and thus turn OFF transistors 56 and 48. Transistors 34 and 48 thus comprise a differentially operated variable impedance or switch means for differentially driving windings 42, 46 of the inductive load. As is well known in the prior art, current can be stopped from flowing through an inductor much quicker than it can be induced to flow. This is true because a switch can be opened and eliminate current flow, whereas a mere closing of a switch not immediately produce a large amount of current flow through an inductive coil. Thus, the turning OFF of transistor 48 will eliminate current flow through winding 46, but the turning ON of transistor 34 will not immediately increase the current flow in winding 42 in proportion to the decrease in current flow in winding 46. Due to its inherent characteristics, choke 58 tends to maintain a substantially constant current flow into junction point 44. In doing this the voltage at junction point 44 becomes highly positive with respect to the voltage at terminal 12. In one embodiment of the invention, with a 10-volt potential from power supply 10 and with a step input to amplifier 22, a potential of 80 volts was produced at junction point 44. As is known to those skilled in the art, an inductor will allow current flow therethrough in accordance with a volt-second product. By raising the voltage applied thereacross, the time to produce current flow therethrough is reduced. Thus, the high voltage produced at terminal 44 with respect to terminal 12 greatly speeds up the current flow through winding 42. The applicant's amplifier thus minimizes the time required to produce changes in deflection currents through the windings 42 and 46.

The purpose of potentiometer 60 is to control the DC-level of current flowing through the deflection coils. This is a necessary adjustment in one form or another in most applications of an amplifier to deflection coils. If, as to be shown in the operation of the circuit illustrated in FIG. 3, the amplifier 22 is provided with internal adjustment of its DC output potential, it is not necessary that power supply 10 float with respect to ground and the bias adjustment comprising components 60–64 is not needed.

The advantage of the circuit of FIG. 2, when it is used to replace the dash block 32 of FIG. 1, is that higher voltages may be used to decrease the time required to produce changes in current flowing through winding 42 or winding 46, or the time circuit may be used with the same voltages but with lower voltage transistors. In the quiescent condition the current paths through windings 42 and 46 are stable and the total current flows through choke 58. Transistors 80 and 90 are saturated due to the currents supplied by transistors 82 and 92 which have their bases connected to the power supply through the choke 58 and resistors 88 and 98 respectively. Transistors 82 and 92 are also saturated due to the voltage drops across the windings 42 and 46 respectively. As will be noted, if the current in either "leg" of the amplifier increases, the voltage drop across its respective winding (42 or 46) increases, thereby increasing the base current to the respective transistor (82 or 92). Transistors 84 and 94 will remain back-biased and OFF in a steady state condition.

In FIG. 2, if a rising step input is applied to terminal 30, a negative-going step input is applied to terminal 52 as was discussed in connection with FIG. 1. When a positive voltage is applied to terminal 30 and a negative voltage is applied to terminal 52, a large positive excursion occurs at junction point 44 due to back e.m.f.-generated choke by 58. More specifically, this input signal causes transistor 34 to be driven into saturation and causes transistor 48 to be turned OFF. Transistor 80, of course, remains saturated due to the increase in current resulting from the larger voltage drop across coil 42, thus maintaining transistor 82 in a saturated condition. In accordance with the dot convention, it will be noted that as the voltage across winding 42 from junction point 44 to the collector of transistor 80 increases, the right-hand side of winding 46 becomes positive with respect to the end connected to junction point 44. Normally, this right-hand side of winding 46 will be at twice the voltage appearing across winding 42 if the collector of transistor 80 is used as a zero reference point. This high voltage will be transmitted through resistor 96 to the base of transistor 94, and will turn transistor 94 ON since its base voltage is much higher than the base voltage of transistor 92. Further, since the input to transistor 94 is much higher than the input to transistor 92, transistor 94 will operate in a saturated condition. The voltage drop across the collector emitter of transistor 94 is much smaller than the base emitter drop of transistor 92. Thus, transistor 92 will be back-biased and turned to an OFF condition.

In one embodiment of the invention wherein a 10-volt potential was applied between terminals 12 and 14 and a step input was applied between terminals 30 and 52, approximately 75 volts was generated by choke 58 at junction point 44. Using these figures, it will be realized that the collector of transistor 90 rises to approximately 150 volts to make the voltage across winding 46 the same as the voltage across winding 42. However, since transistor 94 is saturated, the base of transistor 90 will be at about the 75 volts appearing at junction point 44. Thus, the collector of transistor 48 will be at a potential of about 75 volts. Accordingly, 75-volt transistors may be utilized in this circuit, whereas the circuit shown in block 32 of FIG. 1 requires 150-volt-rated transistors in order to operate with the same potentials from the deflection coils and the choke 58.

As will be realized, if the power supply is of a constant current type which provides a quick response to changing current requirements, choke 58 can be eliminated and the power supply merely connected between junction points 44 and 14. However, as will be realized from later discussions, this results in a substantial increase in cost of the power supply and a substantial increase in operational switching time for step inputs.

In discussing the operation of FIGS. 1 and 2 it will be apparent that the high energy obtainable from coil 58 cannot be continuous. Since the circuit is designed to utilize a low-voltage power supply with large current capabilities, the choke 58 is used to store energy which it delivers in the form of back e.m.f. when a high-speed change is necessary. The circuit therefore must operate on a light duty cycle which is inversely proportional to the voltage produced at junction point 44. As an example, it may be assumed that to obtain the proper speed of operation in winding 42 and 46 a voltage pulse of 80 volts is necessary at terminal 44. If the duration of the pulse is 4 microseconds, the volt-second product is 320 microvolt seconds. If it is further assumed that the power supply voltage available between terminals 12 and 14 is 10 volts, the recovery time of 320 microvolt seconds divided by 10 volts, or 32 microseconds, is necessary before another output of the same magnitude can be obtained. Of course, the same circuit may be used with lower energy requirements to provide a higher duty cycle operation.

The operation of the circuit in FIG. 3 is substantially the same as that in FIG. 1 with the exception that the coils 134 and 146 are isolated from base emitter paths. Therefore, true coil currents are obtained in the resistors 136 and 148 for feedback. As will be noted, the feedback resistors 138 and 150 are cross-connected to the inputs of the amplifier to eliminate any possible irregularities between the amplification of one side and the amplification of the other side of the noninventing differential amplifier. While a well-designed differential amplifier may not need the cross-coupling of the feedback, it is helpful in poorly regulated or cheaply designed amplifiers to produce greater uniformity of operation. As noted previously in FIG. 1, the potentiometer 116 of FIG. 3 is utilized to change the bias current through the coils 134 and 146. It will be realized that some types of amplifiers do not require such a circuit design.

It should be realized in discussing the operation of FIG. 4 that there will be current flowing from positive power terminal 190 to ground 168 through load 206 and current flowing from ground 168 through load 206 to negative terminal 202 when the device is in a quiescent state. At all times during the operation of the device, and even when switching, the total of these two currents will be substantially constant. However, the two currents will be the same only at such times as there is no net effect in the load 206. If the load 206 is the winding of a CRT deflection coil, this is at the zero deflection point. While previously the deflection coils have been shown as two coils or center-tapped coil, the coil can also be utilized as a single-ended load. The circuit of FIG. 4 was in fact designed according to the invention for use with single-ended loads to eliminate the restriction that it could be only used with center-tapped loads.

It may be assumed that a positive going signal applied at terminal 160 and passed through noninverting amplifier 166 will turn OFF transistors 178, 182, and 186 while turning ON transistors 180, 184, and 198. Turning OFF of transistor 186 will produce a negative-going pulse at end 192 with respect to center tap 204. This action will produce a voltage drop from 204 to 192, thus producing a corresponding voltage from terminal 196 to center tap 204. The turn OFF of transistor 186 substantially reduces or eliminates current flow in that leg of the circuit. Center-tapped choke 194 concurrently attempts to maintain the same current flow therethrough. The back e.m.f. which is generated between ground 168 and center tap 204 decreases the time necessary for the change in current to occur in coil 206 by raising the voltage thereacross. Thus, the operation is very similar to the previously described figures.

If a negative-going signal is applied to terminal 160, the opposite conditions will occur and transistor 198 will turn OFF while transistor 186 turns ON. While the back e.m.f. generated in center-tapped choke 194 is still in the same direction as before, the winding from 204 to 192 will be the one which aids in changing the value of current flow through load 206.

As will be noted, the feedback resistor 210 provides an opposite phase feedback signal to the input of amplifier 166 to stabilize operation thereof. As is the case with most circuits, this circuit will operate most satisfactorily with a well-regulated power supply. Due to the large amounts of current required from time to time, the power supply should be capable of high rates of current change while maintaining the voltage output at a substantially constant value.

In summary, it will be realized that the present invention is concerned with utilizing a choke or energy storage device to supply the necessary voltage to reduce switching time of current through an inductive load. However, the circuits as shown will follow the variations in most input signals without the use of the energy storage device 58. Thus, the energy storage device only comes into play for extremely fast excursions in the input signal.

I claim:

1. Amplifier apparatus capable of rapidly varying current through separate portions of an inductive load comprising:

power supply means including first and second terminals for supplying current to circuitry connected therebetween;

inductive load means including first and second inductive elements;

first and second controllable current-limiting means, each including first and second transistors connected in series, the bases of the first and second transistors in each current-limiting means respectively comprising primary and secondary control inputs thereof;

an energy storage inductor;

first connecting means connecting the first inductive element, said first current-limiting means and said energy storage inductor in series between the first and second terminals of said power supply means;

second connecting means connecting the second inductive element, said second current-limiting means and said energy storage inductor in series between the first and second terminals of said power supply means;

differential control means connected to the primary control inputs of said first and said second current-limiting means for differentially limiting the maximum currents through the first and second inductive elements whereby rapidly decreasing the current through one of the first and second inductive elements results in production of a large voltage across the other inductive element due to back e.m.f. generated by said energy storage inductor thereby rapidly increasing the current through the last-named inductive element; and signal means for supplying control signals to the secondary control inputs of said first and second current-limiting means, said signal means responding to voltages in said inductive load means os as to produce control signals which distribute the voltage across said energy storage inductor and the first inductive element between the first and second transistors in said first current-limiting means and to distribute the voltage across said energy storage inductor and the second inductive element between the first and second transistors in said second current-limiting means.

2. The apparatus of claim 1 wherein the first and second inductive elements of said inductive load means are inductively coupled and current flowing from said energy storage inductor into the first and second inductive elements respectively produces magnetic fluxes of opposite polarities.

3. The apparatus of claim 2 wherein said inductive load means comprises a deflection coil for a cathode-ray tube.

4. The apparatus of claim 1 wherein:

said differential control means comprises a differential amplifier having first and second signal outputs connected to the primary control inputs of said first and second current limiting means respectively; and said first and said second connecting means each includes feedback signal means connected to supply a feedback signal to an input of said differential amplifier.

5. The apparatus of claim 4 wherein:

the feedback signal means in said first connecting means comprises a resistive element connected in series with the first inductive element, said first current limiting means and said energy storage inductor; and the feedback signal means in said second connecting means comprises a resistive element connected in series with the second inductive element, said second current-limiting means and said energy storage inductor.

6. The apparatus of claim 5 wherein said signal means includes first and second circuits connected in parallel with the first and second inductive elements respectively, each comprising two transistors of the same polarity type having emitters connected together to provide a control signal and each transistor in each of said first and second circuits having a base connected to the collector of the other transistor therein, the emitters of the first and second transistors in said first and second circuits being connected to the secondary control inputs of said first and second current limiting means respectively.

* * * * *